(12) United States Patent
Clatty et al.

(10) Patent No.: US 7,601,761 B2
(45) Date of Patent: *Oct. 13, 2009

(54) RIGID POLYURETHANE FOAMS WITH INCREASED HEAT PERFORMANCE

(75) Inventors: Jan L. Clatty, Moon Township, PA (US); Timothy R. Whelan, North Versailles, PA (US); Susanne Whelan, legal representative, North Versailles, PA (US); Michael T. Wellman, Moundsville, WV (US); John W. Liddle, Imperial, PA (US); Marie W. Urick, Pittsburgh, PA (US)

(73) Assignee: Bayer MaterialScience LLC, Pittsburgh, PA (US)

( * ) Notice: Subject to any disclaimer, the term of this patent is extended or adjusted under 35 U.S.C. 154(b) by 241 days.

This patent is subject to a terminal disclaimer.

(21) Appl. No.: 11/710,788

(22) Filed: Feb. 26, 2007

(65) Prior Publication Data

US 2008/0207787 A1 Aug. 28, 2008

(51) Int. Cl.
*C08L 75/04* (2006.01)

(52) U.S. Cl. .................. 521/137; 521/130; 521/131; 521/170; 521/174

(58) Field of Classification Search ........... 521/130, 521/131, 137, 170, 174
See application file for complete search history.

(56) References Cited

U.S. PATENT DOCUMENTS

| | | | |
|---|---|---|---|
| 3,549,564 A | 12/1970 | Parker et al. .............. 260/2.5 |
| 5,086,084 A * | 2/1992 | Michaelson .............. 521/137 |
| 5,173,515 A | 12/1992 | von Bonin et al. ......... 521/103 |
| 5,302,634 A | 4/1994 | Mushovic .................. 523/219 |
| 5,369,147 A | 11/1994 | Mushovic .................. 523/219 |
| 5,508,315 A | 4/1996 | Mushovic .................. 521/122 |
| 5,604,266 A | 2/1997 | Mushovic .................. 521/122 |
| 5,739,173 A | 4/1998 | Lutter et al. ............... 521/99 |
| 6,046,247 A | 4/2000 | Glück et al. ............... 521/99 |
| 6,211,259 B1 | 4/2001 | Borden et al. ............. 521/177 |
| 6,265,457 B1 | 7/2001 | Dolgopolsky et al. ..... 521/155 |
| 6,541,534 B2 * | 4/2003 | Allen et al. ................ 521/174 |
| 6,613,827 B2 | 9/2003 | Lundgard et al. .......... 524/386 |
| 6,649,667 B2 | 11/2003 | Clatty ...................... 521/170 |
| 2003/0065045 A1 * | 4/2003 | Falke et al. ............... 521/155 |

FOREIGN PATENT DOCUMENTS

| | | |
|---|---|---|
| CA | 2 367 730 | 9/2000 |
| GB | 1025914 | 4/1966 |

* cited by examiner

*Primary Examiner*—John Cooney
(74) *Attorney, Agent, or Firm*—Lyndanne M. Whalen; John E. Mrozinski, Jr.; Noland J. Cheung

(57) ABSTRACT

The present invention provides a rigid polyurethane foam made from the reaction product, at an isocyanate index of from about 90 to about 400, of a polyisocyanate, and a polyol component containing about 20 to about 80 wt. %, based on the weight of the polyol component, of a double metal cyanide (DMC)-catalyzed polyether polyol having a number average molecular weight of greater than about 1000 Daltons (Da), about 80 to about 20 wt. %, based on the weight of the polyol component, of a sucrose-based polyol having a functionality of from about 2.5 to about 6 and a molecular weight of from about 350 to less than about 1,000, and about 0 to about 40 wt. %, based on the weight of the polyol component, of a low molecular weight organic compound having a number average molecular weight of less than about 600 Da, in the presence of water, polyvinylchloride (PVC) particles having a diameter of from about 0.1 to about 200 microns, and glass beads having a diameter of from about 40 to about 400 microns (about 270 to about 45 mesh), and optionally, in the presence of at least one of carbon dioxide, surfactants, flame retardants, pigments and catalysts, wherein the rigid polyurethane foam with a density of about 10 to about 25 pcf has a heat sag measured at 102 mm overhang at 121° C. and one hour of less than about 8 mm. The inventive rigid polyurethane foams exhibit increased heat performance (decreased heat sag) while also maintaining impact and rebound strengths.

24 Claims, No Drawings

RIGID POLYURETHANE FOAMS WITH INCREASED HEAT PERFORMANCE

FIELD OF THE INVENTION

The present invention relates, in general to polyurethane, and more specifically, to rigid polyurethane foams which exhibit increased heat performance (i.e., decreased heat sag) with maximized impact and rebound strengths.

BACKGROUND OF THE INVENTION

U.S. Pat. No. 5,086,084, issued to Michaelson, teaches a foamed polymeric material suitable as a wood substitute, made of a continuous phase of polyurethane having solid polyvinyl chloride particles dispersed therein. The wood-like material of Michaelson is said to contain about 100 parts of a foamable urethane, and 10 to 50 parts polyvinyl chloride (PVC) particles having a particle size below 200 μm. This material has a microcellular structure with cells on the order of 0.1 mm in average diameter or less. The walls are said to be made of a matrix of polyurethane reinforced with PVC particles. Michaelson, however, makes no mention of the heat performance properties of his wood substitute.

Mushovic, in U.S. Pat. Nos. 5,302,634, 5,369,147, 5,508,315 and 5,604,266, teaches rigid, lightweight filled resin foams having voids dispersed in a continuous phase which is formed from a polyester polyol-polyurethane hybrid resin having reinforcing particles dispersed therein. The hybrid resin of Mushovic is said to form an interpenetrating polymer network with a polyurethane and/or a modified hybrid polyurethane resin. The foams of Mushovic are said to be useful in building materials requiring high tensile and compressive strengths and corrosion and thermal resistance.

U.S. Pat. No. 6,211,259, issued to Borden et al., teaches compositions for making polyurethane and polyurethane foam compositions. These compositions are the reaction product of an isocyanate and a B-Side made of: (i) a polyol having a molecular weight of about 1,000 g/mol or more, and having an average functionality of 2.0 or greater; (ii) a polyol having a Tg of about −80° C. or less, and having a molecular weight of about 1,000 g/mol or more, and having an average functionality of 2.0 or greater; and (iii) a polyhydric alcohol having a molecular weight of about 90 g/mol or more, and having an average functionality of 3.0 or more.

U.S. Pat. No. 6,265,457, issued to Dolgopolsky et al., teaches an isocyanate-based polymer foam made from an isocyanate-based polymer foam matrix having disposed therein a particulate material (such as polyethylene) having an enthalpy of endothermic phase transition of at least about 50 J/g. During the process of Dolgopolsky et al., the particulate material is said to act as a heat sink and undergo an endothermic phase change by absorbing a significant portion of the heat of reaction liberated during the process. Dolgopolsky et al. teach that the heat absorption improves the safety of the process by lowering the maximum exotherm experienced by the foam and/or improves product properties.

Lundgard et al., in U.S. Pat. No. 6,613,827, teach a process for preparing a stable dispersion of a preformed polymer in a polyol in a single mixer. A preformed polymer is mixed under sufficient heat and shear to reduce its particle size to a desired size in the presence of a polyol. The invention of Lundgard et al., also provides stable dispersions of polymers in polyols and polyurethane formulations containing stable dispersions made by their process.

A need continues to exist in the art for improved rigid polyurethane foams, such as those having increased heat performance (i.e., decreased heat sag), which also maintain other desired physical properties.

SUMMARY OF THE INVENTION

Accordingly, the present invention provides such a rigid polyurethane foam made from the reaction product, at an isocyanate index of from about 90 to about 400, of a polyisocyanate and a polyol component containing about 20 to about 80 wt. %, based on the weight of the polyol component, of a double metal cyanide (DMC)-catalyzed polyether polyol having a number average molecular weight of greater than about 1000 Daltons (Da), about 80 to about 20 wt. %, based on the weight of the polyol component, of a sucrose-based polyol having a functionality of from about 2.5 to about 6 and a number average molecular weight of from about 350 to less than about 1,000 Da, and about 0 to about 40 wt. %, based on the weight of the polyol component, of a low molecular weight organic compound having a number average molecular weight of less than about 600 Da in the presence of water, polyvinylchloride (PVC) particles having a diameter of from about 0.1 to about 200 microns, and glass beads having a diameter of from about 40 to about 400 microns (about 270 to about 45 mesh), and optionally, in the presence of at least one of carbon dioxide, surfactants, flame retardants, pigments and catalysts, wherein the rigid polyurethane foam with a density of about 10 to about 25 pcf has a heat sag measured at 102 mm overhang at 121° C. and one hour of less than about 8 mm.

The inventive rigid polyurethane foams exhibit increased heat performance (i.e., decreased heat sag) while maintaining impact and rebound strengths observed in foams made by current processes. These and other advantages and benefits of the present invention will be apparent from the Detailed Description of the Invention herein below.

DETAILED DESCRIPTION OF THE INVENTION

The present invention will now be described for purposes of illustration and not limitation. Except in the operating examples, or where otherwise indicated, all numbers expressing quantities, percentages, OH numbers, functionalities and so forth in the specification are to be understood as being modified in all instances by the term "about." Equivalent weights and molecular weights given herein in Daltons (Da) are number average equivalent weights and number average molecular weights respectively, unless indicated otherwise.

As used herein, the term "glass transition temperature" has the art-accepted meaning, that is, the temperature at which a polymer changes from a brittle vitreous state to a plastic state. As those in the art are aware, the glass transition temperature can be determined by conventional methods such as dynamic mechanical analysis (DMA) or by differential scanning calorimetry (DSC).

The present invention provides a rigid polyurethane foam made from the reaction product, at an isocyanate index of from 90 to 400, of a polyisocyanate and a polyol component containing 20 to 80 wt. %, based on the weight of the polyol component, of a double metal cyanide (DMC)-catalyzed polyether polyol having a number average molecular weight of greater than 1000 Daltons (Da), 80 to 20 wt. %, based on the weight of the polyol component, of a sucrose-based polyol having a functionality of from 2.5 to 6 and a number average molecular weight of from 350 to less than 1,000 Da, and 0 to 40 wt. %, based on the weight of the polyol component, of a low molecular weight organic compound having a number average molecular weight of less than 600 Da in the presence of water, polyvinylchloride (PVC) particles having a diameter of from 0.1 to 200 microns, and glass beads having a diameter of from 40 to 400 microns (270 to 45 mesh), and optionally, in the presence of at least one of carbon dioxide, surfactants, flame retardants, pigments and catalysts, wherein the rigid polyurethane foam with a density of 10 to 25 pcf has a heat sag measured at 102 mm overhang at 121° C. and one hour of less than 8 mm.

The present invention further provides a process for making a rigid polyurethane foam involving reacting at an isocyanate index of from 90 to 400, a polyisocyanate and a polyol component containing 20 to 80 wt. %, based on the weight of the polyol component, of a double metal cyanide (DMC)-catalyzed polyether polyol having a number average molecular weight of greater than 1000 Daltons (Da), 80 to 20 wt. %, based on the weight of the polyol component, of a sucrose-based polyol having a functionality of from 2.5 to 6 and a number average molecular weight of from 350 to less than 1,000 Da, and 0 to 40 wt. %, based on the weight of the polyol component, of a low molecular weight organic compound having a number average molecular weight of less than 600 Da in the presence of water, polyvinylchloride (PVC) particles having a diameter of from 0.1 to 200 microns, and glass beads having a diameter of from 40 to 400 microns (270 to 45 mesh), and optionally, in the presence of at least one of carbon dioxide, surfactants, flame retardants, pigments and catalysts, wherein the rigid polyurethane foam with a density of 10 to 25 pcf has a heat sag measured at 102 mm overhang at 121° C. and one hour of less than 8 mm.

The inventive rigid polyurethane foams display greatly improved heat sag characteristics over those foams made by existing processes. The foams of the present invention exhibit a heat sag (as determined by ASTM D-3769) measured at 102 mm overhang at 121° C. and one hour of less than 8 mm, more preferably less than 5 mm, most preferably less than 3 mm.

The rigid polyurethane foams according to the invention are prepared by reacting the inventive polyol component with at least one organic polyisocyanate. Suitable polyisocyanates are known to those skilled in the art and include unmodified isocyanates, modified polyisocyanates, and isocyanate prepolymers. Such organic polyisocyanates include aliphatic, cycloaliphatic, araliphatic, aromatic, and heterocyclic polyisocyanates of the type described, for example, by W. Siefken in *Justus Liebigs Annalen der Chemie*, 562, pages 75 to 136. Examples of such isocyanates include those represented by the formula

Q(NCO)$_n$ in which n is a number from 2-5, preferably 2-3, and Q is an aliphatic hydrocarbon group containing 2-18, preferably 6-10, carbon atoms; a cycloaliphatic hydrocarbon group containing 4-15, preferably 5-10, carbon atoms; an araliphatic hydrocarbon group containing 8-15, preferably 8-13, carbon atoms; or an aromatic hydrocarbon group containing 6-15, preferably 6-13, carbon atoms.

Examples of suitable isocyanates include ethylene diisocyanate; 1,4-tetramethylene diisocyanate; 1,6-hexamethylene diisocyanate; 1,12-dodecane diisocyanate; cyclobutane-1,3-diisocyanate; cyclohexane-1,3- and -1,4-diisocyanate, and mixtures of these isomers; 1-isocyanato-3,3,5-trimethyl-5-isocyanatomethylcyclohexane (isophorone diisocyanate; e.g., German Auslegeschrift 1,202,785 and U.S. Pat. No. 3,401,190); 2,4- and 2,6-hexahydrotoluene diisocyanate and mixtures of these isomers; dicyclohexylmethane-4,4'-diisocyanate (hydrogenated MDI, or HMDI); 1,3- and 1,4-phenylene diisocyanate; 2,4- and 2,6-toluene diisocyanate and mixtures of these isomers ("TDI"); diphenylmethane-2,4'- and/or -4,4'-diisocyanate ("MDI"); naphthylene-1,5-diisocyanate; triphenylmethane-4,4',4"-triisocyanate; polyphenyl-polymethylene-polyisocyanates of the type which may be obtained by condensing aniline with formaldehyde, followed by phosgenation (crude MDI or polymeric MDI, PMDI), which are described, for example, in GB 878,430 and GB 848,671; norbornane diisocyanates, such as described in U.S. Pat. No. 3,492,330; m- and p-isocyanatophenyl sulfonylisocyanates of the type described in U.S. Pat. No. 3,454,606; perchlorinated aryl polyisocyanates of the type described, for example, in U.S. Pat. No. 3,227,138; modified polyisocyanates containing carbodiimide groups of the type described in U.S. Pat. No. 3,152,162; modified polyisocyanates containing urethane groups of the type described, for example, in U.S. Pat. Nos. 3,394,164 and 3,644,457; modified polyisocyanates containing allophanate groups of the type described, for example, in GB 994,890, BE 761,616, and NL 7,102,524; modified polyisocyanates containing isocyanurate groups of the type described, for example, in U.S. Pat. No. 3,002,973, German Patentschriften 1,022,789, 1,222,067 and 1,027,394, and German Offenlegungsschriften 1,919,034 and 2,004,048; modified polyisocyanates containing urea groups of the type described in German Patentschrift 1,230,778; polyisocyanates containing biuret groups of the type described, for example, in German Patentschrift 1,101,394, U.S. Pat. Nos. 3,124,605 and 3,201,372, and in GB 889,050; polyisocyanates obtained by telomerization reactions of the type described, for example, in U.S. Pat. No. 3,654,106; polyisocyanates containing ester groups of the type described, for example, in GB 965,474 and GB 1,072,956, in U.S. Pat. No. 3,567,763, and in German Patentschrift 1,231, 688; reaction products of the above-mentioned isocyanates with acetals as described in German Patentschrift 1,072,385; and polyisocyanates containing polymeric fatty acid groups of the type described in U.S. Pat. No. 3,455,883. It is also possible to use the isocyanate-containing distillation residues accumulating in the production of isocyanates on a commercial scale, optionally in solution in one or more of the polyisocyanates mentioned above. Those skilled in the art will recognize that it is also possible to use mixtures of the polyisocyanates described above.

In general, it is preferred to use readily available polyisocyanates, such as 2,4- and 2,6-toluene diisocyanates and mixtures of these isomers (TDI); polyphenyl-polymethylene-polyisocyanates of the type obtained by condensing aniline with formaldehyde, followed by phosgenation (crude MDI or polymeric MDI, PMDI); and polyisocyanates containing carbodiimide groups, urethane groups, allophanate groups, isocyanurate groups, urea groups, or biuret groups (modified polyisocyanates). Particularly preferred as polyisocyanate are modified polyisocyanates based on crude MDI or PMDI, and mixtures of these materials with modified polyisocyanates.

Isocyanate-terminated prepolymers may also be employed in the preparation of the foams of the present invention. Prepolymers may be prepared by reacting an excess of organic polyisocyanate or mixtures thereof with a minor amount of an active hydrogen-containing compound as determined by the well-known Zerewitinoff test, as described by Kohler in *Journal of the American Chemical Society*, 49, 3181(1927). These compounds and their methods of preparation are well known to those skilled in the art. The use of any one specific active hydrogen compound is not critical; any such compound can be employed in the practice of the present invention.

The polyol component of the present invention contains at least one sucrose-based polyol having a functionality of from 2.5 to 6 and a molecular weight of from 350 to less than 1,000, more preferably from 600 to less than 1,000, and at least one double metal cyanide (DMC)-catalyzed polyol and optionally at least one low molecular weight organic compound having a molecular weight of less than 600.

The sucrose-based polyol employed in the present invention may be a polyether polyol preferably prepared by reacting sucrose and optionally other initiators (with or without water) with both ethylene oxide and/or propylene oxide in the presence of an alkaline catalyst. The product may be treated with an acid, preferably a hydroxy-carboxylic acid to neutralize the alkaline catalyst. U.S. Pat. No. 4,430,490, which discloses one process for making suitable sucrose-based polyols, is incorporated in its entirety herein by reference thereto. Sucrose polyethers of the type described, for example, in German Auslegeschriften 1,176,358 and 1,064,938 may also be used according to the invention.

The sucrose-based polyether polyol is preferably included in the polyol component in an amount of from 20 to 80% by weight, based on the polyol component, more preferably from 30 to 70% by weight. The sucrose-based polyether polyol may be included in the present invention in an amount ranging between any combination of these values, inclusive of the recited values.

The non-sucrose-based polyether polyol is preferably included in the polyol component in an amount of from 80 to 20% by weight, based on the polyol component, more preferably from 70 to 30% by weight. The non-sucrose-based polyether polyol may be included in the present invention in an amount ranging between any combination of these values, inclusive of the recited values.

As mentioned hereinabove, the non-sucrose based polyol is made in the presence of a double metal cyanide (DMC) catalyst. Any double metal cyanide (DMC) catalyst may be used. Suitable double metal cyanide (DMC) catalysts are known to those skilled in the art. Double metal cyanide complex (DMC) catalysts are non-stoichiometric complexes of a low molecular weight organic complexing agent and optionally other complexing agents with a double metal cyanide salt, e.g. zinc hexacyanocobaltate.

Exemplary double metal cyanide (DMC) complex catalysts for use in the present invention include those suitable for preparation of low unsaturation polyoxyalkylene polyether polyols, such as disclosed in U.S. Pat. Nos. 3,427,256; 3,427,334; 3,427,335; 3,829,505; 4,472,560; 4,477,589; and 5,158,922. The double metal cyanide (DMC) catalysts more preferred are those capable of preparing "ultra-low" unsaturation polyether polyols. Such catalysts are disclosed in U.S. Pat. Nos. 5,470,813 and 5,482,908, and 5,545,601, the entire contents of which are herein incorporated by reference thereto. Particularly preferred herein are those zinc hexacyanocobaltate catalysts prepared by the methods described in U.S. Pat. No. 5,482,908.

The DMC catalyst concentration is chosen to ensure a good control of the polyoxyalkylation reaction under the given reaction conditions. The catalyst concentration is preferably in the range of from 0.0005 wt. % to 1 wt. %, more preferably in the range of from 0.001 wt. % to 0.1 wt. %, most preferably in the range of from 0.001 to 0.01 wt. %, based on the amount of polyol to be produced. The DMC catalyst concentration may be in an amount ranging between any combination of these values, inclusive of the recited values.

As those skilled in the art are aware, an organic complexing ligand may be included with the DMC catalyst. Any organic complexing ligand may be part of the DMC catalyst in the process of the present invention, such as the organic complexing ligands described in U.S. Pat. Nos. 3,404,109, 3,829,505, 3,941,849, 5,158,922 and 5,470,813, as well as in EP 0,700, 949, EP 0,761,708, EP 0,743,093, WO 97/40086 and JP 4,145,123. Such organic complexing ligands include water-soluble organic compounds with heteroatoms, such as oxygen, nitrogen, phosphorus or sulfur, which can form complexes with the DMC compound. Preferred as organic complexing ligands, are alcohols, aldehydes, ketones, ethers, esters, amides, ureas, nitriles, sulfides and mixtures thereof. More preferred organic complexing ligands include water-soluble aliphatic alcohols, such as, for example, ethanol, isopropanol, n-butanol, iso-butanol, sec-butanol and tert-butanol. Tert-butanol is most preferred.

The DMC catalysts may optionally contain at least one functionalized polymer. "Functionalized polymer" as used herein is a polymer or its salt that contains one or more functional groups including oxygen, nitrogen, sulfur, phosphorus or halogen. Examples of functionalized polymers preferred in the inventive process include, but are not limited to, polyethers, polyesters, polycarbonates, polyalkylene glycol sorbitan esters, polyalkylene glycol glycidyl ethers, polyacrylamides, poly(acrylamide-co-acrylic acids), polyacrylic acids, poly(acrylic acid-co-maleic acids), poly(N-vinylpyrrolidone-co-acrylic acids), poly(acrylic acid-co-styrenes) and the salts thereof, maleic acids, styrenes and maleic anhydride copolymers and the salts thereof, block copolymers composed of branched chain ethoxylated alcohols, alkoxylated alcohols such as NEODOL (sold by Shell Chemical Co.), polyether, polyacrylonitriles, polyalkyl acrylates, polyalkyl methacrylates, polyvinyl methyl ethers, polyvinyl ethyl ethers, polyvinyl acetates, polyvinyl alcohols, poly-N-vinylpyrrolidones, polyvinyl methyl ketones, poly(4-vinylphenols), oxazoline polymers, polyalkyleneimines, hydroxyethylcelluloses, polyacetals, glycidyl ethers, glycosides, carboxylic acid esters of polyhydric alcohols, bile acids and their salts, esters or amides, cyclodextrins, phosphorus compounds, unsaturated carboxylic acid esters and ionic surface- or interface-active compounds. Polyether polyols are most preferably used as the functionalized polymer herein.

Where used, functionalized polymers may be present in the DMC catalyst in an amount of from 2 to 80 wt. %, preferably, from 5 to 70 wt. %, more preferably, from 10 to 60 wt. %, based on the total weight of DMC catalyst. The functionalized polymers may be present in the DMC catalyst in an amount ranging between any combination of these values, inclusive of the recited values. In addition, a catalyst polyol suspension, such as described in U.S. Pat. No. 6,699,961, may be used.

Suitable starter or initiator compounds for making the DMC-catalyzed, non-sucrose based polyol include, but are not limited to, $C_1$-$C_{30}$ monols, ethylene glycol, diethylene glycol, triethylene glycol, propylene glycol, dipropylene glycol, tripropylene glycol, pentaerythritol, neopentyl glycol, 1,3 propanediol, 1,4 butanediol, 1,2 butanediol, 1,3 butanediol, 2,3 butanediol, 1,6 hexanediol, water, glycerin, trimethylolpropane, trimethylolethane, ethylene diamine, mixture of isomers of toluene diamine, α-methylglucoside, sorbitol, mannitol, hydroxymethylglucoside, hydroxypropylglucoside, N,N,N',N'-tetrakis[2-hydroxyethyl or 2-hydroxypropyl]ethylene diamine, 1,4-cyclohexanediol, cyclohexanedimethanol, hydroquinone, resorcinol and the like. Mixtures of monomeric initiators or their oxyalkylated oligomers may also be utilized. Preferred initiator compounds are ethylene glycol, propylene glycol, glycerin, trimethylolpropane, and sorbitol.

Alkylene oxides useful in making the non-sucrose based, DMC-catalyzed polyol include, but are not limited to, ethylene oxide, propylene oxide, 1,2- and 2,3-butylene oxide, isobutylene oxide, epichlorohydrin, cyclohexene oxide, styrene oxide, and the higher alkylene oxides such as the $C_5$-$C_{30}$ α-alkylene oxides. Other alkylene oxides mixed with propylene oxide may prove useful in the inventive processes.

Suitable low molecular weight organic compounds to be used in preparing the rigid polyurethane foams as described hereinabove include those compounds having a molecular weight of less than 600, and an average functionality of from 1.0 to 3.0, preferably 1.5 to 2.5, and most preferably 1.8 to 2.2. These compounds are carefully selected from the group consisting of diols, triols, and mixtures thereof, polyethers, polyesters, polythioethers, polyacetals, polycarbonates, and amine terminated polyethers of the type known for the production of polyurethanes. Preferred compounds include the polyethers and polyesters containing from 1.5 to 4.0, preferably 2.0 to 3.0 isocyanate-reactive groups, and having molecular weights of less than 600. Some examples of suitable compounds include, for example, glycols such as, for example, ethylene glycol, propylene glycol, 1,3-propane diol, 1,4-butanediol, 1,6-hexamethylene glycol, dipropylene glycol, tripropylene glycol, diethylene glycol, triethylene glycol, tetraethylene glycol, tetrapropylene glycol, heptapropylene glycol, neopentyl glycol, 2,2,4-trimethyl-1,5-pentanediol, etc. Also suitable compounds include, for example, diamines, triamines, and aminoalcohols such as ethylene diamine, toluene diamine, diethylenetriamine, ammonia, aminoalcohols which can be prepared by the alkoxylation of ammonia, 2,4'-, 2,2'- and 4,4'-methylene dianiline, 2,6- and/or 2,4-toluene diamine and vicinal toluene diamines, p-aminoaniline, 1,5-diaminonaphthalene, mixtures of methylene dianiline and its higher homologs, ethylene diamine, propylene diamine, diethylene triamine, 1,3-diaminopropane, 1,3-diaminobutane and 1,4-diaminobutane, ethanolamine, diethanolamine, and aminoethylethanolamine. Ethylene diamine and toluene diamines are particularly preferred. Preferred polyether compounds include the propylene oxide and ethylene oxide addition products with the glycols, amines, and aminoalcohols mentioned above. Preferred polyesters are obtained from the glycols above, preferably dihydric alcohols to which trihydric alcohols may be added and polybasic, preferably dibasic carboxylic acids. Instead of these polycarboxylic acids, the corresponding carboxylic acid anhydrides or polycarboxylic acid esters of lower alcohols or mixtures thereof may be used for preparing the polyesters. The polycarboxylic acids may be aliphatic, cycloaliphatic, aromatic and/or heterocyclic and they may be unsaturated and/or substituted, e.g. by halogen atoms. Examples of these acids include succinic acid, adipic acid, suberic acid, azelaic acid, sebacic acid, phthalic acid, isophthalic acid, trimellitic acid, phthalic acid anhydride, tetrahydropthalic acid anhydride, hexahydrophthalic acid anhydride, tetrachlorophthalic acid anhydride, endomethylene tetrahydrophthalic acid anhydride, glutaric acid anhydride, maleic acid, maleic acid anhydride, fumaric acid, dimeric and trimeric fatty acids such as oleic acid (which may be mixed with monomeric fatty acids), dimethyl terephthalate and bisglycol terephthalate. These low molecular weight polyols also include compounds such as, for example, cyclohexanedimethanol and the diverse bisphenols.

The low molecular weight organic compound is preferably included in the polyol component in an amount ranging from 0 to 40% by weight, based on the polyol component, more preferably from 0 to 20% by weight. The low molecular weight organic compound may be included in the present invention in an amount ranging between any combination of these values, inclusive of the recited values.

The isocyanate and polyol components are reacted optionally in the presence of at least one of surfactants, flame retardants, pigments, catalysts and fillers. Sufficient water is included so that the density of the resulting rigid foams lies between 10 and 25 pcf. Polyvinyl chloride ("PVC") and glass beads are also included as fillers.

Polyvinyl chloride is produced by polymerizing vinyl chloride by suspension, emulsion, or solution methods. It is may be copolymerized with up to 50% of other compatible monomers. PVC is processed by several methods including blow molding, extrusion, calendering, and coating. Plastisols having PVC resin particles dispersed in a liquid phase of a PVC plasticizer are used to produce coatings and molded products. PVC is resistant to weathering, moisture, most acids, fats, petroleum hydrocarbons and fungi. It is dimensionally stable, and has good dielectric properties. It is commonly used for piping and conduits, containers, liners, and flooring.

Polyvinyl chloride resins useful herein are also well-known copolymers rich in vinyl chloride moieties. Such resins may include up to 50% by weight of a co-monomer such as other vinyls or an acrylate. Alternatively, particles may be purchased commercially from manufacturers such as Goodyear Tire and Rubber Corp., B.F. Goodrich, Westchem International, and Tenneco, Inc. In the present invention, two grades of polyvinyl chloride particles may preferably be utilized. A first grade of particles, a dispersion grade, has particles with diameters less than about 15 microns, an inherent viscosity of 1.20, and a specific gravity of 1.4. The second grade, a blending grade, preferably has particles with a diameter of about 50 microns and an inherent viscosity of 1.13. The instant invention may include mixtures of PVC particles having diameters below 200 microns. The molecular weight of the PVC may vary widely. PVC's having an average molecular weight within the range of 80,000 to 500,000 or higher may preferably be used. Generally, the molecular weight (or inherent viscosity) is not an important factor.

The glass beads included in the polyurethane forming formulation are preferably spherical or near-spherical. These glass beads may be solid or hollow, preferably having a mean diameter in the range of from 40 to 400 microns, more preferably from 25 to 150 microns. Any type of glass may be used, including soda, soda-lime and borosilicate glass. The glass beads may be uncoated or coated as is known to those skilled in the art.

It may be advantageous to employ a minor amount of a surfactant to stabilize the foaming reaction mixture until it obtains rigidity. Any suitable surfactant can be employed in the invention, including silicone/ethylene oxide/propylene oxide copolymers. Examples of surfactants useful in the present invention include those commercially available from manufacturers including Witco Corp., Air Products and Goldschmidt AG. Other suitable surfactants are described in U.S. Pat. Nos. 4,365,024 and 4,529,745. Other, less preferred surfactants include polyethylene glycol ethers of long chain alcohols, tertiary amine or alkanolamine salts of long chain alkyl acid sulfate esters, alkylsulfonic esters, alkylarylsulfonic acids. Such surfactants are employed in amounts sufficient to stabilize the foaming reaction mixture against collapse and the formation of large, and uneven cells. The surfactant may be included in the polyol component in an amount of from 0.05 to 10, and preferably from 0.1 to 6, weight percent of the polyol component. The surfactant may be included in the present invention in an amount ranging between any combination of these values, inclusive of the recited values.

Suitable flame retardants (as used herein also refers to smoke suppressants and other known combustion modifiers), include phosphonates, phosphites, and phosphates (such as dimethyl methylphosphonate, ammonium polyphosphate, and various cyclic phosphate and phosphonate esters, as well as, reactive oligomeric organophosphates having functionality greater than one, known to those skilled in the art); halogen-containing compounds known in the art (such as brominated diphenyl ether and other brominated aromatic and aliphatic compounds); melamine; antimony oxides (such as antimony pentoxide and antimony trioxide); zinc compounds (such as various known zinc borates); aluminum compounds (such as alumina trihydrate); magnesium compounds (such as magnesium hydroxide); and urea. The flame retardant may be included in an amount of from 5 to 75 wt. % of the polyol component, more preferably from 10 to 65 wt. % and most preferably from 10 to 55 wt. %. The flame retardant may be included in the present invention in an amount ranging between any combination of these values, inclusive of the recited values.

Suitable catalysts include tertiary amines and metal compounds known to those skilled in the art. Suitable tertiary amine catalysts include triethylamine, tributylamine, triethylene diamine, N-methylmorpholine, N-ethylmorpholine, N,N,N',N'-tetramethylethylene diamine, pentamethyldiethylene triamine, and higher homologs, 1,4-diazabicyclo[2.2.2] octane, N-methyl-N'-(dimethylaminoethyl)-piperazine, bis(dimethylaminoalkyl)piperazines, N,N-dimethylbenzylamine, N,N-dimethylcyclohexylamine, N,N-diethylbenzylamine, bis(N,N-diethylaminoethyl)adipate, N,N,N',N'-tetramethyl-1,3-butanediamine, N,N-dimethyl-β-phenylethylamine, amine salt of diazabicycloundecene and formic acid, 1,2-dimethylimidazole, 2-methylimidazole, monocyclic and bicyclic amidines, bis(dialkylamino)alkyl ethers (U.S. Pat. No. 3,330,782), and tertiary amines containing amide groups (preferably formamide groups). The catalysts used may also be the known Mannich bases of secondary amines (such as dimethylamine) and aldehydes (preferably formaldehyde) or ketones (such as acetone) and phenols.

Suitable catalysts also include certain tertiary amines containing isocyanate-reactive hydrogen atoms. Examples of such catalysts include triethanolamine, triisopropanolamine, N-methyldiethanolamine, N-ethyldiethanolamine, N,N-dimethylethanolamine, their reaction products with alkylene oxides (such as propylene oxide and/or ethylene oxide) and secondary-tertiary amines.

Other suitable catalysts include organic metal compounds, especially organic tin, bismuth, and zinc compounds. Suitable organic tin compounds include those containing sulfur, such as dioctyl tin mercaptide and, preferably, tin(II) salts of carboxylic acids, such as tin(II) acetate, tin(II) octoate, tin(II) ethylhexoate, and tin(II) laurate, as well as tin(IV) compounds, such as dibutyltin dilaurate, dibutyltin dichloride, dibutyltin diacetate, dibutytin maleate, and dioctyltin diacetate. Suitable bismuth compounds include bismuth neodecanoate, bismuth versalate, and various bismuth carboxylates known in the art. Suitable zinc compounds include zinc neodecanoate and zinc versalate. Mixed metal salts containing more than one metal (such as carboxylic acid salts containing both zinc and bismuth) are also suitable catalysts. Any of the above-mentioned catalysts may, of course, be used as mixtures. Suitable catalyst mixtures may be found in U.S. Pat. No. 5,401,824.

The catalyst(s) may be included in the polyol component in an amount preferably such that the catalyst(s) chosen produce the desired reactivity profile based on the chosen volume of blowing agent used.

When carrying out the reaction of the polyol component with the polyisocyanate, the quantity of the polyisocyanate should preferably be such that the isocyanate index is from 90 to 400, more preferably from 95 to 150. The isocyanate index of the foams of the present invention may range between any combination of these values, inclusive of the recited values. By "isocyanate index" is meant the quotient of the number of isocyanate groups divided by the number of isocyanate-reactive groups, multiplied by 100. The foam-forming formulation in the present invention is preferably a liquid at room temperature.

The inventors herein contemplate that the foamed products of the present invention may be used, for example, as building materials, such as lightweight roofing materials (slates or tiles), as decorative or architectural products, as outdoor products, as low cost insulation panels, as fencing, as lightweight buoyant or corrosion-resistant marine products, etc., by forming the foamed resin in a mold of suitable size and shape.

EXAMPLES

The present invention is further illustrated, but is not to be limited, by the following examples. All quantities given in "parts" and "percents" are understood to be by weight, unless otherwise indicated.

| | |
|---|---|
| POLYOL A | a polyether polyol available from Harvin Reaction Technology, Inc. as HARVINOL PE-450; |
| POLYOL B | a DMC-catalyzed, polyether polyol based on propylene glycol and propylene oxide having a hydroxyl number of about 111 mg KOH/g and a functionality of about 2; |
| POLYOL C | a sucrose-initiated polyether polyol having an OH number of about 470 mg KOH/g and a functionality of 5.2; |
| POLYOL D | an aromatic polyester polyol having a hydroxyl number of 175-195, available as TEROL 198 from Oxid; |
| SURFACTANT A | polyalkylene oxide methyl siloxane copolymer available from OSI as NIAX L 1000; |
| CATALYST A | dibutyltin dilaurate, available from Air Products as DABCO T-12; |
| CATALYST B | a 70 weight % solution of bis(dimethylaminoethyl) ether in dipropylene glycol, available from OSI as NIAX A-1; |
| ISOCYANATE A | a carbodiimide modified diphenylmethane diisocyanate terminated polyester prepolymer having an isocyanate content of about 18.9% by weight; |
| ISOCYANATE B | a modified polymeric methylenediphenyl diisocyanate having an NCO content of about 30.5; |
| ISOCYANATE C | a modified polymeric methylenediphenyl diisocyanate having an NCO content of about 27.6; |
| SOLID GLASS BEADS | 100/200 mesh glass beads, available from Flex-O-Lite, Inc. of St. Louis, MO USA as BLAST-O-LITE Beads; |
| PVC A | particles of polyvinyl chloride, available from Geon, Inc. of Akron, OH USA as GEON 121AR; having an average particle size of about 1 micron; |
| PVC B | particles of vinyl chloride, available from Colorite Specialty Resins of Burlington, NJ USA as Suspension Homopolymer Resin CP 501; having an average particle size of about 45 microns; |
| FLAME RETARDANT A | decabromodiphenyl oxide, available from Great Lakes Chemicals, as Great Lakes DE-83R; |
| FLAME RETARDANT B | antimony (III) oxide; and |
| PIGMENT A | brown pigment, available from Hoover Color Corp. of Hiwassee, VA USA as BR 677 DRY. |

Comparative Example 1 and Examples 2-5

Rigid foams were made by combining the components in the amounts given below in Table I. Processing details for these foams are also given below in Table I.

TABLE I

| Formulation Details | Ex. C1 | Ex. 2 | Ex. 3 | Ex. 4 | Ex. 5 |
|---|---|---|---|---|---|
| POLYOL A | 43.84 | | | | |
| POLYOL B | | 30 | 30 | 15 | 15 |
| POLYOL C | | 20 | 20 | 20 | 20 |
| POLYOL D | | | | 15 | 15 |
| SURFACTANT A | 0.45 | 0.45 | 0.45 | 0.45 | 0.45 |
| WATER* | 0.409 | 0.409 | 0.409 | 0.409 | 0.409 |
| CATALYST A | 0.18 | 0.18 | 0.18 | 0.18 | 0.18 |
| CATALYST B | 0.06 | 0.06 | 0.06 | 0.06 | 0.06 |
| ISOCYANATE A | 110 | | | | |
| ISOCYANATE B | | 49.05 | | | 52.56 |
| ISOCYANATE C | | | 45.55 | 48.81 | |
| SOLID GLASS BEADS | 32.98 | 21.92 | 21.15 | 21.87 | 22.69 |
| PVC A | 7.447 | 8.16 | 7.87 | 8.14 | 8.45 |
| FLAME RETARDANT A | 7.447 | 5.408 | 5.22 | 5.39 | 5.6 |
| PVC B | 4.255 | | | | |
| FLAME RETARDANT B | 3.617 | | | | |
| BR 677 DRY | 2.128 | 1.968 | 1.9 | 1.96 | 2.04 |
| Filled Ratio A/100B | 107 | 55 | 52 | 55 | 58 |
| Index | 105 | 130 | 110 | 110 | 130 |
| Cream Time (s) | 44 | 23 | 27 | 22 | 23 |
| Gel Time (s) | 69 | 29 | 32 | 28 | 29 |
| Tack Time (s) | 74 | 36 | 38 | 36 | 37 |
| Free Rise Density (pcf) | 14.78 | 10.33 | 10.47 | 10.68 | 10.39 |
| Machine or Lab | Handmix | Handmix | Handmix | Handmix | Handmix |
| Polyol Temperature (° F.) | 77 | 72 | 72 | 72 | 72 |
| Iso Temperature (° F.) | 77 | 72 | 72 | 72 | 72 |
| Mold Temperature (° F.) | 140 | 140 | 140 | 140 | 140 |
| Demold Time (s) | 240 | 720 | 600 | 600 | 600 |
| Release Agent | CT-2002 | CT-2006 | CT-2006 | CT-2006 | CT-2006 |
| Type Of Sample | Panel | Plaque | Plaque | Plaque | Plaque |

*The amount of water added was calculated based on the amount of water found in the polyol. Enough water was added to bring the final concentration to the same level in all of the Examples.

The rigid foams made in the above examples were subjected to physical property testing as follows: Density (ASTM D1622); Hardness (Shore D—ASTM D2240); Flexural modulus and strength (ASTM D790); Tensile strength at break and ultimate (ASTM D638); Elongation—ultimate and yield (ASTM D638); Charpy Impact (ASTM D6110); Heat Sag (ASTM D3769). The results are summarized below in Table II.

As can be appreciated by reference to Table II, heat sag is considerably improved in the inventive foams prepared in Examples 2-5 compared to that of the control (Ex. C1) while other physical properties, in particular the flexural modulus, impact properties, tensile strength and hardness were comparable. The inventive formulations unexpectedly provided significantly improved heat sag performance without increasing the overall Tg of the polyurethane foam.

TABLE II

| Average Physical Testing | Ex. C1 | Ex. 2 | Ex. 3 | Ex. 4 | Ex. 5 |
|---|---|---|---|---|---|
| Thickness (in) | 0.522 | 0.523 | 0.536 | 0.525 | 0.521 |
| Density (lb/ft$^3$) | 19 | 19 | 19 | 19 | 19 |
| Hardness - Shore D at 1 sec | 32 | 30 | 30 | 19 | 22 |
| Hardness - Shore D at 5 sec | 31 | 29 | 29 | 18 | 21 |
| Flex modulus (psi) | 22,620 | 22,230 | 20,010 | 28,490 | 25,070 |
| Flex strength (psi) | 581 | 644 | 562 | 684 | 692 |
| Tensile strength at break (psi) | 437 | 389 | 436 | 476 | 505 |
| Tensile strength - ultimate (psi) | 438 | 389 | 436 | 476 | 511 |
| Elongation - ultimate (%) | 9 | 8 | 12 | 9 | 8 |
| Elongation - yield (%) | 9 | 8 | 12 | 9 | 8 |
| Charpy Impact (ft · lbf/in$^2$) | 1.3 | 0.7 | 0.8 | 1.2 | 1.1 |
| Heat Sag (4"overhang, at 250° F., 1 hr) (mm) | 9 | 1 | 1 | 1 | 1 |
| Drop tower impact at 18 J (deflection at max load) (mm)[3] | 6.9 | 6.5 | 6.6 | 6.5 | 6.5 |
| [2]DMA T ° C. at max. hard block G" - (closest to Tg) | 60 | 50 | NA | NA | NA |
| [2]TMA (% penetration) | 6.8 | 12.1 | NA | NA | NA |
| [2]TMA (% recovery) | 2.8 | 5.2 | NA | NA | NA |

[1]Note: DMA & TMA data are from ⅛" thick panels made according to Ex. C1 and Ex. 2.
[2]Samples impacted on DynaTup Drop Tower using Class IV conditions with 2" diameter steel hemisphere with 6.35 kg mass at an impact energy of 18.6 J.

The foregoing examples of the present invention are offered for the purpose of illustration and not limitation. It will be apparent to those skilled in the art that the embodiments described herein may be modified or revised in various ways without departing from the spirit and scope of the invention. The scope of the invention is to be measured by the appended claims.

What is claimed is:

1. A rigid polyurethane foam comprising the reaction product, at an isocyanate index of from about 90 to about 400, of:
a polyisocyanate; and
a polyol component comprising
about 20 to about 80 wt. %, based on the weight of the polyol component, of a double metal cyanide (DMC)-catalyzed polyether polyol having a number average molecular weight of greater than about 1000 Daltons (Da),
about 80 to about 20 wt. %, based on the weight of the polyol component, of a sucrose-based polyol having a functionality of from about 2.5 to about 6 and a number average molecular weight of from about 350 to less than about 1,000 Da, and
about 0 to about 40 wt. %, based on the weight of the polyol component, of a low molecular weight organic compound having a number average molecular weight of less than about 600 Da;
in the presence of
water,
polyvinylchloride (PVC) particles having a diameter of from about 0.1 to about 200 microns, and
glass beads having a diameter of from about 40 to about 400 microns (about 270 to about 45 mesh), and
optionally, in the presence of at least one of carbon dioxide, surfactants, flame retardants, pigments and catalysts,
wherein the rigid polyurethane foam with a density of about 10 to about 25 pcf has a heat sag measured at 102 mm overhang at 121° C. and one hour of less than about 8 mm.

2. The rigid polyurethane foam according to claim 1, wherein the polyisocyanate is selected from the group consisting of ethylene diisocyanate, 1,4-tetramethylene diisocyanate, 1,6-hexamethylene diisocyanate, 1,12-dodecane diisocyanate, cyclobutane-1,3-diisocyanate, cyclohexane-1,3-and -1,4-diisocyanate, 1-isocyanato-3,3,5-trimethyl-5-isocyanatomethyl-cyclohexane (isophorone diisocyanate), 2,4- and 2,6-hexahydrotoluene diisocyanate, dicyclohexylmethane-4,4'-diisocyanate (hydrogenated MDI, or HMDI), 1,3- and 1,4-phenylene diisocyanate, 2,4- and 2,6-toluene diisocyanate (TDI), diphenylmethane-2,4'- and/or -4,4'-diisocyanate (MDI), naphthylene-1,5-diisocyanate, triphenylmethane-4,4',4"-triisocyanate, polyphenyl-polymethylene-polyisocyanates (crude MDI or PMDI), norbornane diisocyanates, m- and p-isocyanatophenyl sulfonylisocyanates, perchlorinated aryl polyisocyanates, carbodiimide-modified polyisocyanates, urethane-modified polyisocyanates, allophanate-modified polyisocyanates, isocyanurate-modified polyisocyanates, urea-modified polyisocyanates, biuret containing polyisocyanates and isocyanate-terminated prepolymers.

3. The rigid polyurethane foam according to claim 1, wherein the polyisocyanate is modified crude MDI or PMDI.

4. The rigid polyurethane foam according to claim 1, wherein the polyvinylchloride (PVC) particles have a diameter of from about 0.1 to about 50 microns.

5. The rigid polyurethane foam according to claim 1, wherein the glass beads have a diameter of from about 25 to about 150 microns.

6. The rigid polyurethane foam according to claim 1, wherein the double metal cyanide (DMC)-catalyzed polyether polyol comprises from about 30 to about 70 wt. %, based on the weight of the polyol component.

7. The rigid polyurethane foam according to claim 1, wherein the sucrose-based polyol comprises from about 30 to about 70 wt. %, based on the weight of the polyol component.

8. The rigid polyurethane foam according to claim 1, wherein the sucrose-based polyol has a number average molecular weight of from about 600 to less than about 1,000 Da.

9. The rigid polyurethane foam according to claim 1, wherein the low molecular weight organic compound comprises from about 0 to about 20 wt. %, based on the weight of the polyol component.

10. The rigid polyurethane foam according to claim 1, wherein the isocyanate index is from about 95 to about 150.

11. The rigid polyurethane foam according to claim 1, wherein the rigid polyurethane foam has a heat sag measured at 102 mm overhang at 121° C. and one hour of less than about 5 mm.

12. The rigid polyurethane foam according to claim 1, wherein the rigid polyurethane foam has a heat sag measured at 102 mm overhang at 121° C. and one hour of less than about 3 mm.

13. A process for making a rigid polyurethane foam comprising reacting at an isocyanate index of from about 90 to about 400:
a polyisocyanate; with
a polyol component comprising
about 20 to about 80 wt. %, based on the weight of the polyol component, of a double metal cyanide (DMC)-catalyzed polyether polyol having a number average molecular weight of greater than about 1000 Daltons (Da),
about 80 to about 20 wt. %, based on the weight of the polyol component, of a sucrose-based polyol having a functionality of from about 2.5 to about 6 and a molecular weight of from about 350 to less than about 1,000 Da, and
about 0 to about 40 wt. %, based on the weight of the polyol component, of a low molecular weight organic compound having a number average molecular weight of less than about 600 Da;
in the presence of
water,
polyvinylchloride (PVC) particles having a diameter of from about 0.1 to about 200 microns, and
glass beads having a diameter of from about 40 to about 400 microns (about 270 to about 45 mesh), and
optionally, in the presence of at least one of carbon dioxide, surfactants, flame retardants, pigments and catalysts,
wherein the rigid polyurethane foam with a density of about 10 to about 25 pcf has a heat sag measured at 102 mm overhang at 121° C. and one hour of less than about 8 mm.

14. The process according to claim 13, wherein the at least one polyisocyanate is selected from the group consisting of ethylene diisocyanate, 1,4-tetramethylene diisocyanate, 1,6-hexamethylene diisocyanate, 1,12-dodecane diisocyanate, cyclobutane-1,3-diisocyanate, cyclohexane-1,3-and -1,4-diisocyanate, 1-isocyanato-3,3,5-trimethyl-5-isocyanatomethyl-cyclohexane (isophorone diisocyanate), 2,4- and 2,6-hexahydrotoluene diisocyanate, dicyclohexylmethane-4,4'-diisocyanate (hydrogenated MDI, or HMDI), 1,3- and 1,4-phenylene diisocyanate, 2,4- and 2,6-toluene diisocyanate (TDI), diphenylmethane-2,4'- and/or -4,4'-diisocyanate (MDI), naphthylene-1,5-diisocyanate, triphenyl-methane-4, 4',4"-triisocyanate, polyphenyl-polymethylene-polyisocyanates (crude MDI), norbornane diisocyanates, m- and p-isocyanatophenyl sulfonylisocyanates, perchlorinated aryl polyisocyanates, carbodiimide-modified polyisocyanates, urethane-modified polyisocyanates, allophanate-modified polyisocyanates, isocyanurate-modified polyisocyanates, urea-modified polyisocyanates, biuret containing polyisocyanates and isocyanate-terminated prepolymers.

15. The process according to claim 13, wherein the polyisocyanate is modified crude MDI or PMDI.

16. The process according to claim 13, wherein the polyvinylchloride (PVC) particles have a diameter of from about 0.1 to about 50 microns.

17. The process according to claim 13, wherein the glass beads have a diameter of from about 25 to about 150 microns.

18. The process according to claim 13, wherein the double metal cyanide (DMC)-catalyzed polyether polyol comprises from about 30 to about 70 wt. %, based on the weight of the polyol component.

19. The process according to claim 13, wherein the sucrose-based polyol comprises from about 30 to about 70 wt. %, based on the weight of the polyol component.

20. The process according to claim 13, wherein the sucrose-based polyol has a number average molecular weight of from about 600 to less than about 1,000 Da.

21. The process according to claim 13, wherein the low molecular weight organic compound comprises from about 0 to about 20 wt. %, based on the weight of the polyol component.

22. The process according to claim 13, wherein the isocyanate index is from about 95 to about 150.

23. The process according to claim 13, wherein the rigid polyurethane foam has a heat sag measured at 102 mm overhang at 121° C. and one hour of less than about 5 mm.

24. The process according to claim 13, wherein the rigid polyurethane foam has a heat sag measured at 102 mm overhang at 121° C. and one hour of less than about 3 mm.

* * * * *